United States Patent [19]
Heisel et al.

[11] Patent Number: 4,988,431
[45] Date of Patent: Jan. 29, 1991

[54] PROCESS FOR PERFORMING CATALYTIC REACTIONS

[75] Inventors: Michael Heisel, Pullach; Freimut Marold, Neubiberg; Reiner Lohmueller, Emden, all of Fed. Rep. of Germany

[73] Assignee: Linde Aktiengesellschaft, Wiesbaden, Fed. Rep. of Germany

[21] Appl. No.: 97,000

[22] Filed: Sep. 16, 1987

[30] Foreign Application Priority Data

Sep. 17, 1986 [DE] Fed. Rep. of Germany ....... 3631642

[51] Int. Cl.⁵ .............................................. C10G 23/00
[52] U.S. Cl. ....................................... 208/67; 208/147; 208/149; 208/159; 422/208; 422/211; 422/236
[58] Field of Search ................. 208/159, 160, 147, 46, 208/49, 67, 72–75, 57, 58, 149, 151; 422/191, 198, 200, 223, 208, 211, 236

[56] References Cited

U.S. PATENT DOCUMENTS

| | | | |
|---|---|---|---|
| 2,306,011 | 12/1942 | Burk et al. | 422/223 X |
| 2,444,990 | 7/1948 | Hemminger | 208/74 |
| 2,446,925 | 8/1948 | Hemminger | 208/74 |
| 2,469,329 | 5/1949 | Crowley, Jr. | 422/200 |
| 2,532,128 | 11/1950 | Teter | 208/74 X |
| 2,596,299 | 5/1952 | Simpson | 422/200 |
| 3,728,249 | 4/1973 | Antezana et al. | 208/57 |
| 4,061,659 | 12/1977 | Nielsen et al. | 549/534 |
| 4,542,252 | 9/1985 | Graziani et al. | 422/200 X |

*Primary Examiner*—Glenn Caldarola
*Attorney, Agent, or Firm*—Millen, White & Zelano

[57] ABSTRACT

A process for performing catalytic reactions with intensive heat of reaction, in which a reaction mixture is conducted through a catalyst bed, from which the reaction heat is removed or to which it is fed by indirect heat exchange with a heat exchange medium. The catalyst bed adjoins at least one bed of a catalytically inert material, which also is in indirect heat exchange with the heat exchange medium.

13 Claims, 1 Drawing Sheet

PROCESS FOR PERFORMING CATALYTIC REACTIONS

BACKGROUND OF THE INVENTION

This invention relates to a process and apparatus for performing catalytic reactions with intense heats of reaction, in which a reaction mixture is conducted through a catalyst bed from which the reaction heat is either removed or to which it is fed by indirect heat exchange.

Such a process is known from DE-OS No. 32 170 66. In this known process, a homogeneous catalyst bed, passed through only by coiled cooling pipes, is provided within a reactor jacket. Therefore, a reaction mixture entering into the reactor enters directly into the catalyst bed and after leaving the catalyst bed is immediately removed from the reactor. Although in particular cases performance of such a reaction is acceptable, there are many cases of application, in which a more flexible technique is desirable. This can be the case, for example, if the reactants are mixed with one another only upon entering into the reactor and temperature peaks are produced in the entry area of the catalyst bed without sufficient mixing or if individual reactants must be introduced into the reactor at different places.

Therefore, an object of the invention is to provide a design for process as well as a device of the abovementioned type so that a flexible operation with a reliable mastery of the heat engineering problems is assured for a plurality of reactions.

The objects of this invention are attained by providing at least one bed of catalytically inert material adjoining the catalyst bed with both beds in indirect heat exchange with the heat exchange medium.

SUMMARY OF THE INVENTION

In a process aspect, this invention relates to a process for performing a catalytic reaction having an intense heat of reaction, in which a reaction mixture is conducted through a catalyst bed from which the reaction heat is removed or too which it is fed by indirect heat exchange with a heat exchange medium, wherein the catalyst bed adjoins at least one catalytically inert bed of a catalytically inert material which also is in indirect heat exchange with the heat exchange medium.

In an apparatus aspect, this invention relates to a device for performing catalytic reactions involving an intense heat of reaction, in which a reaction mixture is conducted through a catalyst bed, from which the reaction heat is removed or to which it is fed by indirect heat exchange by means of cooling or heating coils, and wherein the catalyst bed adjoins at least one bed of a catalytically inert material which is also in indirect heat exchange with the heat exchange medium by means of cooling or heating coils.

DETAILED DISCUSSION

The invention, in which one or more inert layers adjoin a catalyst bed, whether upstream and/or downstream from a single catalyst bed or two or more catalyst beds, makes possible in a simple way a matching of the reaction equipment to a plurality of special process conditions. In this case, the inert bed can perform various functions, for example as a gas distribution zone, as a mixing zone for the reactants, as a heat exchange zone, as a purification zone as well as for other purposes.

The advantages of the process according to the invention include, for example, the possibility of introducing the various reactants successively, i.e., by steps in a simple way into the reactor, in which the reactants are fed into the inert bed which acts as gas distribution zone.

It is also possible to mix the reactants at least partially with one another outside the reactor, and the inert bed additionally serves as a mixing bed, in which an intensive mixing of the reactants takes place. If it is necessary to achieve the desired reaction temperature, an inert bed in the entry area of a reactor, can also serve for preheating or cooling of the incoming raw gas with heating or cooling coils present in the inert bed.

In such a case, the exothermia of the downstream process step can serve as a heat source, with the heat being carried by the cooling medium in the heat exchange coils from the downstream catalyst zone into the area of the upstream inert bed. In a similar manner, a part of the aftercooling of the product gas can be performed in the discharge area of a reactor by the cooling medium there being preheated with the reacted product gas.

When the process according to the invention is used, two or more catalyzed reactions can also be performed in a single reactor, for example, a reduction gas production with a subsequent hydrogenation. In this case, it is advantageous if different catalyst materials are used in different catalyst beds for the respective reactions. The inert beds placed between individual catalyst beds in this case in addition also serve for spatially separating the catalyst beds from one another to make possible better charging/discharging of the reactor, to achieve better gas distribution and to have the possibility, e.g., again to use the catalyst poured above, to replace the catalyst poured below.

To make possible an easy separation of the inert material from the catalyst material it is provided in an embodiment of the invention that the inert material consists of particles of a different size from that of the catalyst particles. The inert material can exhibit any shape, but it is often spherical, for example in the form of aluminum, stainless steel, glass or ceramic balls or activated carbon or other inert materials, for various end use applications, the material selected being inert to the reactants and reaction products.

By placing an inert bed between two catalyst beds, among other things, the inert layers can serve for improvement of the cooling or warming of the reaction mixture between two catalyst zones. This is especially advantageous in the case of strongly exothermic reactions, in which inadequate cooling is achieved within the catalyst bed with the cooling coil alone.

In this way an inadmissibly high temperature rise can be avoided and a strongly exothermic reaction, which usually is performed, for example, in a plurality of adiabatically operated reactors, connected in series, can be performed within a single reactor with a small number of catalyst layers.

The invention can also be used in the case of a plurality of reactions, for example, in oxidations with a metering of the oxygen advantageously taking place by steps or in the case of reductions, in which, again advantageously the reduction gas, for example hydrogen, is fed in by steps.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein:

The invention is explained in greater detail by means of an embodiment diagrammatically represented in FIG. 1, wherein:

Figure 1:
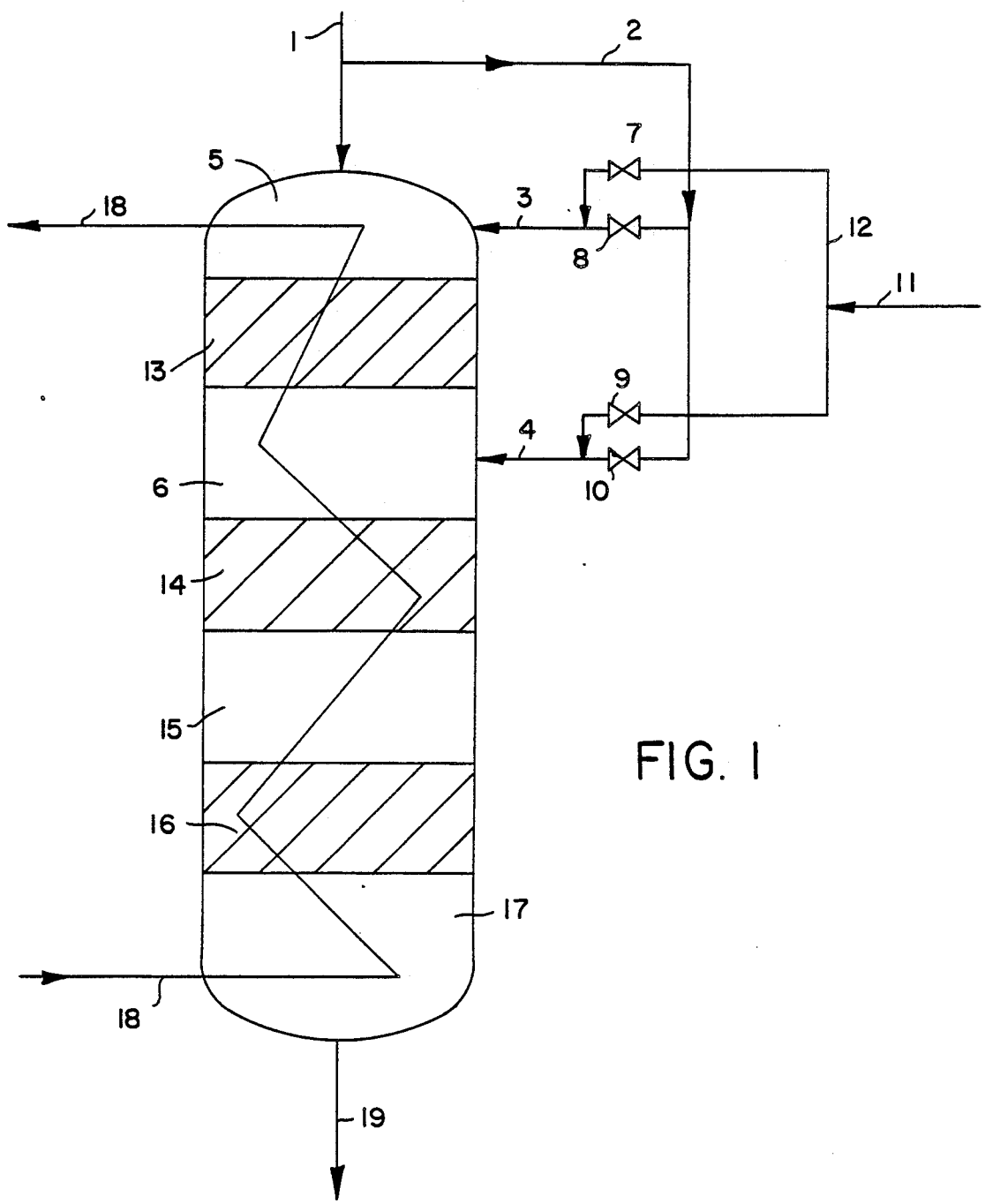

A raw gas mixture is fed to inert beds 5 and 6 by pipe 1 and by pipes 3 and 4, corrected to pipe 1 by pipe 2. The composition of the raw gas currents in pipes 3 and 4 is determined by adjustment of valves 7, 8, 9 and 10, so that the gas current in pipes 3 and 4 is provided wholly or partially by the raw gas mixture from pipe 2 or wholly or partially by raw gas fed by pipes 11 and 12. This distribution of the raw gas current is recommended in the case of intense exothermic reactions, just as it is possible, instead, to feed other reactants to the catalyst bed by pipes 11 and 12.

The raw gas flows successively alternately through inert beds 5, 6, 15 and 17, as well as catalyst beds 13, 14 and 16, where, for example, an exothermic reaction takes place in the latter beds. The heat released during the reaction is removed countercurrently by means of a heat-carrier medium in heat exchange coils 18.

The reaction gas is removed from the reactor by pipe 19.

Specific cases of use of the process according to the invention are described below.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by volume.

The entire text of all applications, patents and publications, if any, cited above and below are hereby incorporated by reference.

EXAMPLE 1

Coke oven gas contains ingredients tending to polymerize, as, for example, acetylene. After heating to the reaction temperature, problems easily occur because of these components, since the polymers lead to a rapid contamination of the catalyst. To be able to continue to process the coke oven gas, the polymer formers therefore must first be hydrogenated. For this purpose, a compression and heating are necessary. In this connection, to eliminate polymerization as much as possible, the path from the compressor to the hydrogenation reactor must be kept as short as possible. This is attained according to the invention, employing a reactor as described herein and in the drawing, by there being provided in the reactor upstream from the catalyst bed an inert zone into which the reaction heat is transferred for preheating of the coke oven gas. In this case, the catalyst bed and the upstream inert bed are passed through by a cooling coil, through which the cooling medium flows countercurrent to the direction of flow in the beds. Thus, the inert bed simultaneously serves as filter for the polymers that have formed nonetheless and thus protects the catalyst.

Coke oven gas with composition as shown in Table 1 is fed through pipe 1 at a rate of 1350 kmol/h into a reactor, similar to that shown in the drawing, which contains a first inert bed 13 upstream and a second inert bed 6 downstream from a single catalyst zone 13. Inert bed 5 (300 cm.depth; 280 cm diameter) is formed of ceramic balls (10 mm diameter).

Catalyst bed 13 (560 cm.depth; 280 cm diameter) is packed with particulate Palladium catalyst (av. particle size 2.5 mm diameter). A cooling coil cooled with water (190° C.) goes through the inert beds as well as the catalyst zone at a rate of 85 l/min. The entry area of the reactor is packed with a bed 5 of ceramic balls, which separates any polymers formed from the feed gas. At the same time in inert bed 5, which is designed as a heating zone, the feed gas is heated by the heat exchange pipe 18 to a temperature of between 150° and 200° C. At this temperature, the gas enters catalyst bed 13, where hydrogenation of the unsaturated hydrocarbons, nitrogen oxides, organic sulfur, and oxygen in the gas takes place. Gas and catalyst are cooled by cooling coil 18, which heats the inert bed 5.

In this embodiment because the reactor lacks catalyst beds 14 and 16, valves 9 and 10 are closed. Bed 6 in this case consists of CuO tablets (5 mm diameter) with a bed diameter of 280 cm, depth; 490 cm. There the gas is cooled to approximately 200° C. and at the same time desulfurized. Due to the very low sulfur content at the inlet to bed 6, this bed has a service life of approximately 6–8 years, i.e., similar to that of bed 13.

The CuO in this example is not a catalyst, rather an absorbent which is more or less inert.

TABLE 1

| components | COKE OVEN GAS TO REACTOR | | | |
|---|---|---|---|---|
| | molar fraction | molar quantity | weight fraction | weight quantity |
| $H_2$ | 0.545961 | 735.91188 | 0.97779 | 1483.55398 |
| $N_2$ | 0.065536 | 88.33760 | 0.163100 | 2474.63623 |
| $O_2$ | 0.008937 | 12.04592 | 0.025405 | 385.45505 |
| CO | 0.074473 | 100.38360 | 0.185321 | 2811.79460 |
| $CO_2$ | 0.020852 | 28.10650 | 0.081527 | 1256.96409 |
| $CH_4$ | 0.249236 | 335.95032 | 0.355224 | 5389.65071 |
| $C_2H_2$ | 0.000993 | 1.33839 | 0.002297 | 34.84925 |
| $C_2H_4$ | 0.017873 | 24.09196 | 0.044546 | 675.88069 |
| $C_2H_6$ | 0.001986 | 2.67689 | 0.005305 | 80.49448 |
| $C_3H_6$ | 0.001986 | 2.67688 | 0.007424 | 112.64675 |
| $C_3H_8$ | 0.000993 | 1.33845 | 0.003890 | 59.02177 |
| 1 butene | 0.001986 | 2.67690 | 0.009899 | 150.19630 |
| $C_4H_{10}$ | 0.000993 | 1.33845 | 0.005127 | 77.79634 |
| $C_6H_6$ | 0.0 | 0.0 | 0.0 | 0.0 |
| $C_{10}H_8$ | 0.0 | 0.0 | 0.0 | 0.0 |
| $H_2S$ | 0.000000 | 0.00000 | 0.000000 | 0.00006 |
| COS | 0.000000 | 0.00047 | 0.000002 | 0.02814 |
| $CS_2$ | 0.000001 | 0.00201 | 0.000010 | 0.15285 |
| HCN | 0.000037 | 0.04962 | 0.000088 | 1.34088 |
| $NH_3$ | 0.000012 | 0.01594 | 0.000018 | 0.27150 |
| NO | 0.000000 | 0.00027 | 0.000001 | 0.00803 |
| $H_2O$ | 0.008145 | 10.97923 | 0.013036 | 197.79405 |
| Total quantity | | 1347.92128 KMOL/HR | | 15172.53576 KG/HR |
| TEMPERATURE | C | 125.635 | | |
| PRESSURE | BAR | 12.05000 | | |

EXAMPLE 2

Another example of a use for the process according to the invention is in the purification of noble gases, for example, in the separation of helium from hydrogen or krypton from methane. To recover the noble gases from mixtures with hydrogen in pure form, first the hydrogen portion, which is mostly very high and typically over 50%, is catalytically burned. Because of the high exothermia of this reaction, previously only a little conversion can be performed per each catalyst step, then a cooling and a recycling are necessary. In the usual processes recycling ratios of about 50 are necessary, i.e., about a 50-fold excess amount of the newly fed raw gas is run in the cycle to limit the temperature rise resulting from the hydrogen combustion. According to experience with such high recycling ratios, significant amounts of the noble gas are lost by leakage, which reduces the profitability of the process. When the process according to the invention is used as described herein and in the drawing, the gas purification can be substantially simplified. For this purpose, a reactor can be used which has several separate catalyst zones with inert beds installed in between each, and a partial current of the oxygen necessary for the combustion is fed to each of the inert beds. Within the inert beds then an intense mixing of the noble gas to be purified with the oxygen takes place, so that no explosive mixture occurs on the catalyst. Temperature excursions are safely avoided by lower oxygen content. Gas recycling is thereby rendered unnecessary.

For treatment of a gas, consisting of 35% by volume of hydrogen and 65% by volume of helium, a reactor with about 7 catalytic steps is suitable. By the heat exchange adjustment common to all catalyst beds, the correct reaction temperature is set everywhere within the reactor, for example an entry temperature of 110° C. in the individual catalyst zones.

EXAMPLE 3

In a third embodiment of the invention, styrene waste gas is subjected to a desulfurization and deoxo treatment. A styrene waste gas, which contains 84.1 mol of hydrogen, 8.0 mol % of $CO_2$, 2.0 mol % of $CH_4$, 0.5 mol % of $C_2H_4$, 0.2 mol % of $C_2H_6$, 0.1 mol % of $C_3H_6$, 3.9 of $N_2$, 0.1 mol % of Ar, 0.5 mol % of CO, 0.1 mol % of $O_2$, 0.5 mol % of aromatic hydrocarbons, 5 volume ppm of sulfur compounds and traces of oxoalcohols, is fed into a reactor, as shown in the drawing which contains an inert bed upstream and downstream from a catalyst zone. A cooling coil goes through the inert beds as well as the catalyst zone. In the entry area of the reactor a bed containing, for example, zinc oxide or copper, is placed to separate the sulfur compounds from the waste gas. The gas then goes into a first inert bed, which is designed as a heating zone, in which the waste gas is heated to a temperature between 150° and 200° C. At this temperature, then in the catalyst bed the conversion of the oxygen in the waste gas takes place, mainly with $H_2$ and CO to water and $CO_2$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for performing a catalytic reaction having an intense heat of reaction, in which a reaction mixture is conducted through a catalyst bed from which the reaction heat is removed, the improvement wherein a first catalyst bed adjoins an upstream granular bed of material which is catalytically inert with respect to the reactions in the adjoining first catalyst bed, passing said reaction mixture first through the upstream catalytically inert granular bed of material, then passing the reaction mixture through at least two catalyst beds and through a catalytically inert bed positioned therebetween, and passing a heat exchange medium successively through said beds and in indirect heat exchange therewith.

2. A process according to claim 1, wherien said reaction mixture and said heat exchange medium are passed overall countercurrently and vertically through said beds.

3. Process according to claim 1, wherien the reaction mixture is conducted alternatively and successively through a plurality of catalyst beds and plurality of catalytically inert beds positioned between the catalyst beds.

4. Process according to claim 1, wherein coreactants are fed successively to the reactor, the feeding of the coreactants taking place in the inert bed.

5. Process according to claim 1, wherein the catalyst bed is formed of a particulate catalyst and the particle size of the latter differs from that of the catalytically inert granular material.

6. Process according to claim 5, wherein packing material is used as the catalytically inert material.

7. Process according to claim 1, wherein a first catalytically inert bed is positioned upstream from the catalyst bed and a second catalytically inert bed is positioned downstream from the catalyst bed.

8. Process according to claim 7, wherein a plurality of catalyst beds are positioned between a plurality of catalytically inert beds.

9. Process according to claim 8, wherein the various beds are contained in a single reactor in which the beds are in direct contact with adjacent beds.

10. Process according to claim 9, wherein at least one of the reactant gases is fed only to the catalytically inert beds.

11. Process according to claim 10, wherein a portion of the reactant gases is fed to each of the catalytically inert beds.

12. A process according to claim 9, wherien said reaction mixture and said heat exchange medium are passed overall countercurrently and vertically through said beds.

13. A process according to claim 5, wherein said reaction mixture and said heat exchange medium are passed overall countercurrently and vertically through said beds.

* * * * *